W. B. ARNOLD AND A. G. FRYE.
A. L. ARNOLD AND J. B. STUDLEY, EXECUTORS OF W. B. ARNOLD, DEC'D.
WELT GROOVING MACHINE.
APPLICATION FILED DEC. 10, 1917.

1,318,340.

Patented Oct. 7, 1919.

Inventor:
William B. Arnold
Arthur G. Frye
by Robt. P. Haines
Attorney

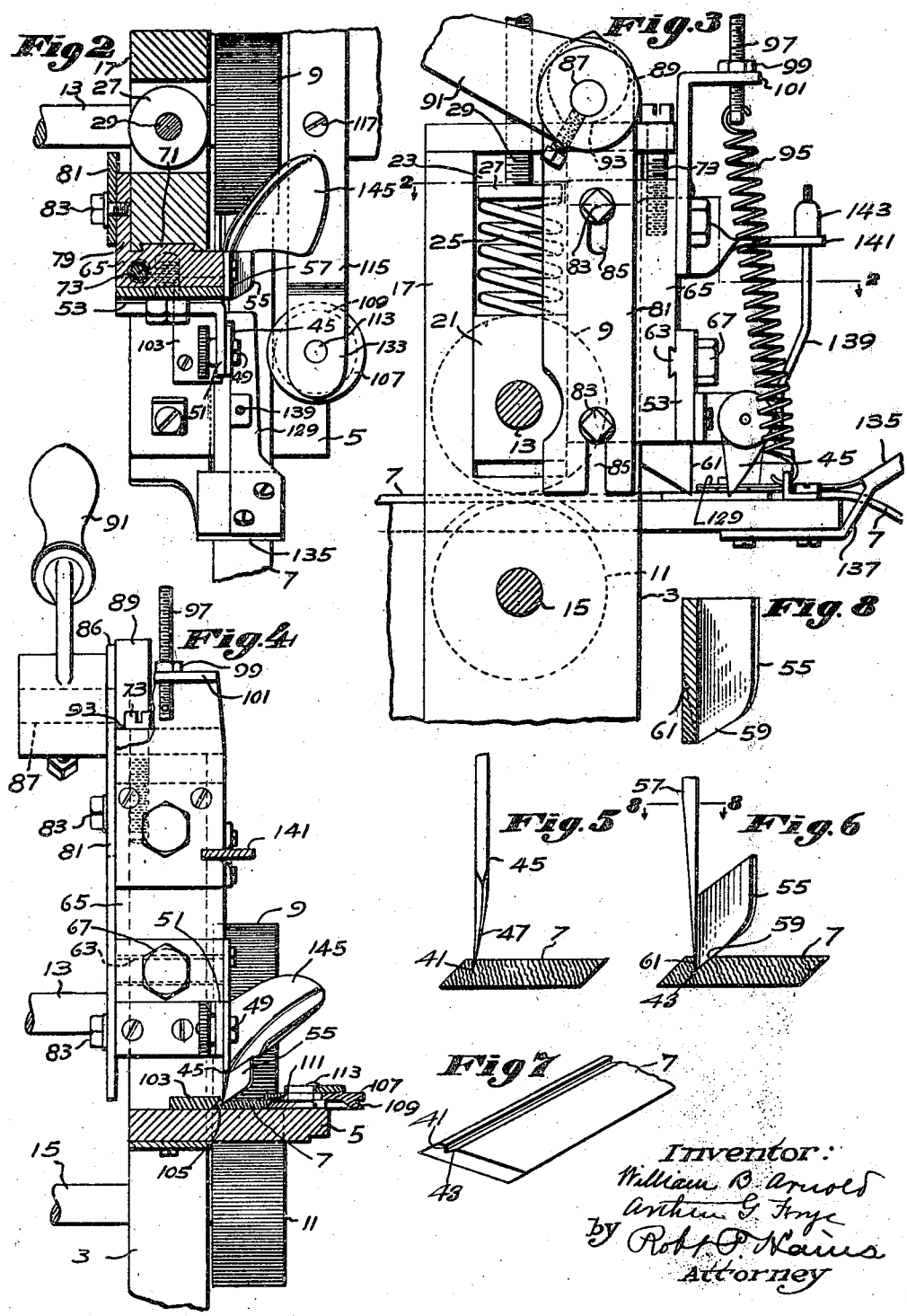

UNITED STATES PATENT OFFICE.

WILLIAM B. ARNOLD AND ARTHUR G. FRYE, OF NORTH ABINGTON, MASSACHUSETTS, ASSIGNORS TO SAID WILLIAM B. ARNOLD; ABBIE L. ARNOLD, AND J. BUTLER STUDLEY EXECUTORS OF SAID WILLIAM B. ARNOLD, DECEASED.

WELT-GROOVING MACHINE.

1,318,340.   Specification of Letters Patent.   Patented Oct. 7, 1919.

Application filed December 10, 1917. Serial No. 206,364.

*To all whom it may concern:*

Be it known that we, WILLIAM B. ARNOLD and ARTHUR G. FRYE, citizens of the United States, and residents of North Abington, county of Plymouth, and State of Massachusetts, have invented an Improvement in Welt-Grooving Machines, of which the following description, in connection with the accompanying drawings, is a specification, like characters on the drawings representing like parts.

The invention hereinafter described relates to machines for forming the grooves in welts of boots and shoes adapted to receive the stitching for securing the welt to the upper and insole of the shoe.

This groove is cut in the flesh face of the welt which is sometimes relatively soft and flabby as compared to the grain face of the welt. Heretofore, a single tool, shaped to conform to the contour of groove to be produced has been used for this purpose, but such a tool is liable to tear through the leather, especially if the groove is to be formed closely adjacent to one edge of the welt and leave a very narrow thickness of material between said groove and edge. In producing welts having opposed beveled edges with resultant economy of material as set forth in Letters Patent of the United States, No. 1,122,845, dated December 29, 1914, it is possible to form the stitch receiving groove very closely adjacent to one of the beveled edges, without loss of substantial thickness of material to hold the stitching when an edge portion of the welt is bent downward against the outer face of the upper. However, during the operation of cutting the groove, there is so little stock between the groove and beveled edge of the welt that there is danger of tearing through the stock, especially if the welt is not of uniformly strong high grade material.

One of the objects of the present invention is to provide a welt grooving machine having a pair of knives or cutters which may act progressively on the stock and produce transverse meeting incisions forming the stitch receiving groove therein, the construction being such that the pull on and tendency to tear the stock is greatly reduced, and as a consequence, a smooth, uniform, clean cut groove is produced.

Another object of the invention is to provide improved means for guiding the welt as it is fed through the machine, so that the groove will be located a predetermined distance from and parallel to one edge of the welt.

And still another object of the invention is to provide means adjacent the cutters for holding or positioning the welt, so that the welt cannot pucker and soft and flabby leather cannot tear while the cutters are passing therethrough.

The character of the invention may be best understood by reference to the following description of one good form thereof shown in the accompanying drawings, wherein:—

Fig. 2 is a horizontal section taken on line 2—2 of Fig. 3;

Fig. 3 is a rear elevation showing adjusting devices for the knives;

Fig. 4 is a view partly in section and partly in end elevation of parts shown in Fig. 2;

Fig. 5 is a detail view showing the relation of the pilot knife to the welt strip in making its incision therein;

Fig. 6 is a detail view showing the grooving knife and its relation to the welt strip while making its incision therein;

Fig. 7 is a perspective view of a welt having a groove cut therein by the machine; and Fig. 8 is a horizontal section taken on line 8—8 of Fig. 6.

Figure 1:
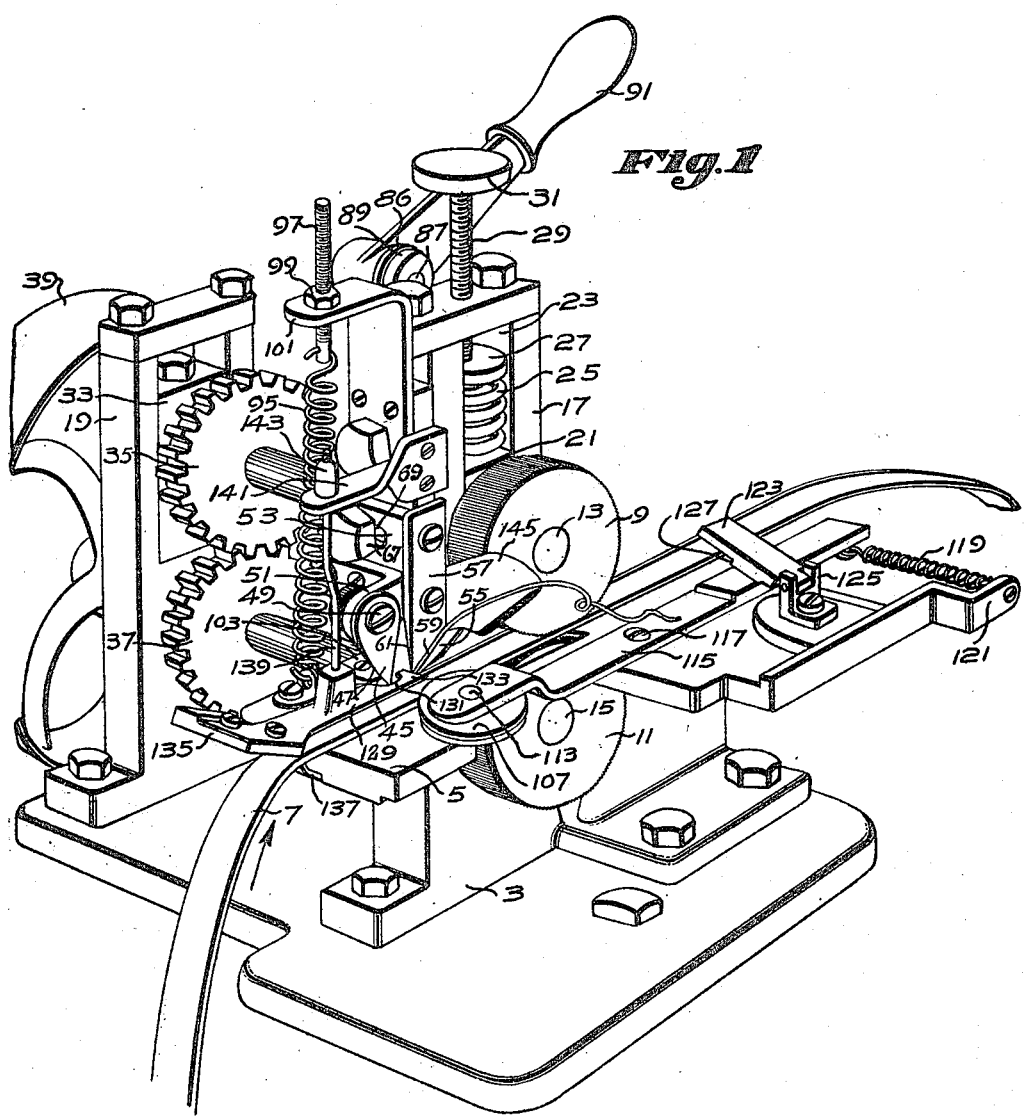
Figure 1 is a perspective view of the machine shown herein as embodying the invention.

Referring to the drawings, the welt grooving machine shown therein as an exemplification of the invention comprises a base 1 (Fig. 1) having an upright 3 thereon supporting a bed plate 5 and supporting the welt strip 7 operated on by the machine. To feed the welt strip over said bed plate, suitable means may be provided, in the present instance, in the form of upper and lower rolls 9 and 11 having corrugated or roughened peripheries for gripping the strip and feeding the same. These rolls are mounted fast on shafts 13 and 15 journaled in bearings in boxes in a front standard 17 and a rear standard 19. To press the upper roll downward toward the lower roll, the bearing box 21 therefore may be mounted to slide in a guideway 23 in the standard 17, and may be pressed downward by a helical spring 25 confined against said box, and a follower 27 on an adjusting screw 29 threaded in the upper end of said standard and having a handle 31 thereon. The extent of movement of the upper feed roll 9 is so slight that it is unnecessary to have its bearing box 33 pressed by a spring in the standard 19. To rotate said feed rolls, intermeshing gears 35 and 37 may be mounted fast on their shafts, and the lower shaft may have a pulley 39 fast on the rear end thereof adapted to be driven by a belt from any suitable source of power.

The machine is designed to form a strip receiving groove in the welt strip extending longitudinally thereof. In the present instance of the invention, this groove is V-shaped in transverse section, as will be noted in Fig. 7. To produce a clean cut uniform groove at a predetermined distance from one of the edges of the welt strip without tearing the leather, the walls of the groove are formed in the strip by a pair of knives or cutters, one of which produces an incision 41 in the strip, which may be substantially vertical or at a slight angle from the vertical. In the present instance, this incision is made at an angle of 10° to the vertical. The other knife or cutter produces an incision 43 passing through the flesh face of the strip obliquely toward and meeting the first incision.

In the present instance of the invention, the first incision is produced by a pilot knife 45 (Figs. 1 and 5) of thin steel tapered toward its lower end and having a sharp forward cutting edge 47. The shank of the knife has a hole therein receiving a bolt 49 for securing the knife to a suitable support, in the present exemplification of the invention, in the form of an angle bracket 51 projecting laterally from a slide 53.

In the present instance of the invention, the oblique incision is produced by a knife 55 (Figs. 1 and 6) projecting laterally and upwardly from its shank 57, which may also be secured to the slide 53, referred to, carrying the pilot knife. The knife 55 has a forward sharpened edge 59, and preferably the forward edge 61 of the shank 57 is sharpened, although it will be understood the pilot knife is relied upon to make the substantially vertical incision in the strip.

The knives may be adjusted to form the groove at varying distances from the edge of the welt strip as required. To accomplish this, the slide 53 may have a horizontal dovetail 63 (Fig. 3) projecting from a face thereof into a groove in a carrier conveniently in the form of a plate 65. The slide may be secured in different positions of adjustment by a screw bolt 67 projecting through an elongated slot 69 (Fig. 1) in said slide and tapped into said carrier plate.

It is desirable to adjust the knives toward and from the bed plate to vary the depth of the groove produced in the welt strip. To accomplish this, the carrier plate 65 may have a dovetail 71 (Fig. 2) projecting into a vertical groove in the standard 17, referred to. To slide the carrier plate vertically with the desirable nicety of adjustment, a screw 73 (Fig. 3) may be entered loosely through an overhanging portion of the upper end of the standard 17, and may be threaded in said carirer.

To facilitate introduction of the welt strip into the machine beneath the knives, they may be adjusted toward and from their operative positions. For this purpose the carrier 65 may have a flange 79 (Figs. 2 and 3) projecting laterally therefrom along the rear face of the standard 17, and a plate 81 or equivalent member may be connected to said flange by a pair of screw bolts 83 entered through slots 85 in said plate and tapped into said flange. The upper end of said plate may be formed to provide a strap 86 (Figs. 1 and 3) embracing a stud shaft 87 having a cam 89 and a hand lever 91 fast thereon on opposite sides of said strap. The cam projects over and rests upon the upper end of the standard 17, and may have a flattened portion 93 to determine the lowered position of the carrier. The screws 83 may be released to allow adjustment of the carrier by the screws 73 without affecting the proper relation of the plate 81 and cam 89 with respect to the standard. The construction is such, that when the hand lever is rocked in a clockwise direction (Fig. 3), the cam bearing on the standard will lift the plate 81 and the carrier 65, thereby raising the knives a sufficient distance above the bed plate to allow ready introduction of the welt strip beneath them. Then the hand lever may be rocked in a contraclockwise direction until limited by the engagement of the flattened portion of the cam with the standard, thereby bringing the knives down into positions where they are the proper distance above the bed plate to produce a groove in the strip of the required depth. To yieldingly hold the knives down into this position, a helical spring 95 may be provided having its lower end anchored to the bed plate, and its upper end connected by an adjustable screw 97 and a lock nut 99 with an angle bracket 101 projecting laterally from said carrier. The construction is such, that the carrier will be pulled downward and maintain the cam in engagement with the standard, but will permit the carrier to be elevated by the hand lever and cam at the times required.

The welt strip should be properly guided when fed through the machine, in order that the groove may be formed therein parallel to an edge of the strip and at the predetermined distance therefrom. To accomplish this, a guide 103 (Figs. 2 and 4) may be mounted on and secured to the bed plate. In the present instance, the groove is cut in a strip having beveled edges, and therefore, to accommodate this form of strip, the active edge 105 of the guide may be undercut or beveled, as will be noted in Fig. 4. To press and maintain the welt strip in close engagement with said guide edge, in the present form of the invention, a guide roller 107 may be provided having a beveled edge 109 for engaging the outer beveled edge of the welt strip, and having a circumferential shoulder 111 adapted to overlie the margin of the upper surface of the welt strip above its outer beveled edge. This roller is connected by a pin 113 to one end of a lever 115 fulcrumed on a pin 117 on the bed plate, the opposite end of said lever being connected by a helical spring 119 (Fig. 1) with a bracket 121 mounted on the front edge of the bed plate. The construction is such, that the guide roller is urged constantly inward against the outer beveled edge of the welt strip and presses and maintains the inner edge of said strip in close engagement with the edge of the guide 103. It will be noted that the roller is located at a point opposite the knives so as to properly position the welt strip at the points where the knives are actively engaged in making their incisions in the strip. After the welt strip has passed the guide roller, the spring 119 will shift the roller inward until limited by its engagement with the guide 103. The roller is then shifted outward manually to allow the introduction of the next strip to be operated on into the machine. To hold the roller away from the guide 103 while the strip is being inserted, a trigger 123 (Fig. 1) may be provided pivotally connected to a bracket 125 mounted on the bed, and having a shoulder 127 adapted to engage the edge of the lever 115. After the strip has been inserted in the machine, the trigger may be tripped to allow the spring to press the roll into active engagement with the strip.

To prevent the strip from buckling upward between the guide and the roller while it is pulled by the rolls past the knives, and to prevent tearing of the leather in case a soft or flabby portion is passing the knives, in the present instance of the invention, a presser member conveniently in the form of a spring plate 129 (Figs. 1 and 2) may be superposed on the strip; said plate having a recess 131 receiving the point of the pilot knife and a finger or portion 133 projecting over the leather between the knives. The construction is such, that the leather is engaged by said presser plate closely adjacent the points of active engagement of the knives with the leather. The plate may be mounted on a bracket 135 having an arm 137 secured to the under face of the bed plate. To contribute to the positioning of said presser plate, it may be connected by a rod 139 (Figs. 1 and 3) with a bracket 141 projecting laterally from and secured to the carrier 65, referred to. The resilience of the spring plate is such that it tends to press downward on the upper surface of the strip. To limit or vary this pressure, the rod 139 may have an adjusting nut 143 threaded thereon and adapted to rest against the upper face of the bracket 141. When the carrier is elevated to raise the knives to allow the welt strip to be introduced beneath them, the bracket 141 and rod 139 will flex the presser plate upward somewhat, but the extent of movement of the knives toward and from their operative positions is so slight that it is merely necessary to slightly flex the presser plate as the carrier is moved.

To guide the stock removed from the strip in forming the groove away from the knives, a guide or shield member 145 (Fig. 1) may be provided conveniently secured to the slide 53 carrying the knives.

The operation of the machine will be readily understood from the foregoing description. The welt strip is introduced beneath the presser plate 129 between the guide 103 and the roller 107, and thence between the feed rolls 9 and 11. Then the hand lever 91 is rocked to allow the spring 95 to slide the carrier downward and force the knives into the strip. As the strip is drawn through the machine by the feed rolls, the pilot knife will first make the substantially vertical incision in the strip, and then the grooving knife will make its incision in the strip transversely to and meeting the incision made by the pilot knife. Since the knives act progressively and independently on the strip and produce the groove by two independent meeting incisions instead of digging or gouging out the groove in one operation, the pull on the leather and tendency to tear or distort the same is greatly reduced, and as a consequence, a clean cut groove may be made in the strip parallel to an edge thereof and at the predetermined distance from said edge required. Since the machine can be relied upon to produce the clean cut uniform groove required in every strip fed through the machine, waste of leather from improper grooving is eliminated and an important economy obtained.

The shape of the following knife is such that it serves as a sort of plow to spread open the groove in the welt and facilitate introduction of the stitching therein.

The knives shown are one good means for carrying the invention into practical effect, but other cutters might be used within the invention.

It will be understood that the invention is not limited to the specific embodiment shown, but that various deviations may be made therefrom without departing from the spirit and scope of the appended claims.

What is claimed is:—

1. A welt grooving machine, comprising, in combination, means to feed a welt strip through the machine, means to guide the strip as it is fed, and means to cut a longitudinal channel in a face of the welt, including an upright pilot knife having a cutting edge for preliminarily slitting the welt transversely to the plane thereof, and a following knife located back of said pilot knife and having an edge for subsequently making an incision oblique to and meeting the bottom of the slit made by the pilot knife.

2. A welt grooving machine, comprising, in combination, means to feed a welt strip, means to guide the edges of the strip as it is fed, means to cut a longitudinal channel in a face of the welt, including an upright pilot knife having a cutting edge for preliminarily slitting the welt transversely to the plane thereof, and a following knife located back of said pilot knife and having an edge for subsequently making an incision oblique to and meeting the bottom of the slit made by the pilot knife; and a presser member to engage the upper surface of the welt between said knives and prevent puckering of the welt by the action of said knives.

3. A welt grooving machine, comprising, in combination, a bed plate, means to feed a welt strip along said bed plate, a guide for one edge of the welt mounted on said bed plate, a roller for engaging the opposite edge of the welt, spring means for pressing said roller against said edge, an upright pilot knife having a cutting edge for preliminarily slitting the welt transversely to the plane thereof, a following knife located back of said pilot knife and having an edge for subsequently making an incision oblique to and meeting the bottom of the slit made by the pilot knife, and a presser member having a portion for pressing the surface of the welt between said knives and located substantially opposite to said roller.

4. A welt grooving machine, comprising, in combination, a table, a pair of feed rolls for feeding the welt along said table, a carrier, a pilot knife for preliminarily slitting a welt transversely to the plane thereof, a following knife located back of said pilot knife and having an edge for subsequently making an incision oblique to and meeting the bottom of the slit made by the pilot knife, a slide supporting said knives and adjustably mounted on said carrier that the knives may be set to make their cuts at varying distances from an edge of the welt, and means coöperating with said carrier bodily to move the knives into and out of active position.

In testimony whereof, we have signed our names to this specification.

WILLIAM B. ARNOLD.
ARTHUR G. FRYE.

Copies of this patent may be obtained for five cents each, by addressing the "Commissioner of Patents, Washington, D. C."